United States Patent
Han et al.

(10) Patent No.: US 11,137,804 B2
(45) Date of Patent: Oct. 5, 2021

(54) LOW POWER ACTIVITY MONITORING WITH ADAPTIVE DUTY CYCLE IN A SENSOR HUB

(71) Applicant: Intel Corporation, Santa Clara, CA (US)

(72) Inventors: Hemin Han, Shanghai (CN); Ke Han, Shanghai (CN); Xun Wang, Shanghai (CN); Qin Duan, Shanghai (CN); Lili Ma, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 766 days.

(21) Appl. No.: 15/755,509

(22) PCT Filed: Aug. 10, 2016

(86) PCT No.: PCT/IB2016/054837
§ 371 (c)(1),
(2) Date: Feb. 28, 2018

(87) PCT Pub. No.: WO2017/051269
PCT Pub. Date: Mar. 30, 2017

(65) Prior Publication Data
US 2020/0285287 A1 Sep. 10, 2020

(30) Foreign Application Priority Data
Sep. 26, 2015 (WO) ............... PCT/IB2015/001702

(51) Int. Cl.
*G06F 1/16* (2006.01)
*G06F 1/3234* (2019.01)

(52) U.S. Cl.
CPC ............ *G06F 1/1694* (2013.01); *G06F 1/325* (2013.01)

(58) Field of Classification Search
CPC ...... G06F 1/1694; G06F 1/3215; G06F 1/325; G06F 3/0346
See application file for complete search history.

(56) References Cited

U.S. PATENT DOCUMENTS

| 2012/0062470 A1 | 3/2012 | Chang |
| 2012/0279304 A1 | 11/2012 | Lee et al. |

(Continued)

OTHER PUBLICATIONS

International Search Report and Written Opinion for PCT Patent Application No. PCT/IB2016/054837, dated Dec. 7, 2016, 11 pages.

*Primary Examiner* — Yaron Cohen
(74) *Attorney, Agent, or Firm* — Compass IP Law PC (57) ABSTRACT

An activity monitoring circuit enables power conservation for an activity monitoring system. The activity monitoring system includes a sensor device that generates activity data based on detected movement. An activity monitoring circuit receives the activity data as input from the sensor device, and processes the activity data. Based on the processing, the activity monitoring circuit signals the sensor device to change a duty cycle of its operation, by adjusting how long it is on and off. The activity monitoring circuit can include a sensor hub that determines an activity state indicated by the activity data and generates a prediction of stability of the determined activity state based on historical activity data. Based on activity state and stability, the sensor hub can determine a duty cycle for operation of the sensor device.

18 Claims, 6 Drawing Sheets

(56) References Cited

U.S. PATENT DOCUMENTS

| | | |
|---|---|---|
| 2013/0179110 A1 | 7/2013 | Lee |
| 2014/0215246 A1 | 7/2014 | Lee et al. |
| 2014/0288436 A1* | 9/2014 | Venkatraman ......... A61B 5/742 |
| | | 600/479 |
| 2014/0288876 A1 | 9/2014 | Donaldson |

* cited by examiner

WEIGHT VALUES TABLE 610

| | ACTIVITY | t-0 | t-1 | t-2 | t-3 | t-4 | t-5 | t-6 |
|---|---|---|---|---|---|---|---|---|
| 612 | WALKING | 0.317 | 0.267 | 0.217 | 0.167 | 0.117 | 0.070 | 0.020 |
| 614 | RUNNING | 0.317 | 0.267 | 0.217 | 0.167 | 0.117 | 0.070 | 0.020 |
| 616 | BIKING | 0.250 | 0.222 | 0.194 | 0.167 | 0.139 | 0.111 | 0.083 |
| 618 | IN-CAR | 0.250 | 0.222 | 0.194 | 0.167 | 0.139 | 0.111 | 0.083 |
| 620 | SEDENTARY | 0.333 | 0.278 | 0.222 | 0.167 | 0.111 | 0.056 | 0.000 |
| 622 | TILTING | 0.333 | 0.278 | 0.222 | 0.167 | 0.111 | 0.056 | 0.000 |
| 624 | UNKNOWN | 0.333 | 0.278 | 0.222 | 0.167 | 0.111 | 0.056 | 0.000 |

FIG. 6A

RESULTS TABLE 630

| | SOLUTION TYPE | DUTY CYCLE (%) | ACCURACY (%) | LATENCY (ms) |
|---|---|---|---|---|
| 632 | FULL DUTY CYCLE W/O HISTORICAL PROCESSING | 100 | 86.5 | 6511 |
| 634 | FULL DUTY CYCLE WITH HISTORICAL PROCESSING | 100 | 92.2 | 12258 |
| 636 | FIXED DUTY CYCLE | 22.6 | 83.6 | 15225 |
| 638 | ADAPTIVE DUTY CYCLE | 22.6 | 90.6 | 12773 |

LOW POWER ACTIVITY MONITORING WITH ADAPTIVE DUTY CYCLE IN A SENSOR HUB

CLAIM OF PRIORITY

This application is a U.S. National Phase application under 35 U.S.C. § 371 of International Application No. PCT/IB2016/054837, filed Aug. 10, 2016, entitled "LOW POWER ACTIVITY MONITORING WITH ADAPTIVE DUTY CYCLE IN A SENSOR HUB", which in turn is based on PCT/IB2015/001702, entitled, "LOW POWER ACTIVITY MONITORING WITH ADAPTIVE DUTY CYCLE IN A SENSOR HUB", the entire contents of which are incorporated herein by reference. The present application claims the benefit of priority of these applications.

FIELD

Descriptions relate generally to sensors, and certain descriptions relate more particularly to power management of an activity monitoring system.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2015, Intel Corporation, All Rights Reserved.

BACKGROUND

As computing devices become smaller and more capable, they are frequently carried around. Sometimes users carry devices capable of monitoring fitness information or tracking activity of the user. Frequently, computing devices can perform activity monitoring and determine what activity state a user is in. Activity monitoring is common in hardware and software platforms, and typically relies on an accelerometer within the hardware platform to generate input to make activity monitoring determinations. One or more algorithms within the platform periodically sample the accelerometer and analyze the readings to infer whether the user is Idle, Walking, Running, or In-Vehicle, for example.

Activity monitoring traditionally operates in an always-on manner, which can have a significant impact on power consumption. Given that most mobile devices have strict restrictions on power consumption, activity monitoring operations would preferably not be always on. Solutions exist to enforce a duty cycle of operation on the sensors and/or the sensor monitoring systems. For example, a system can have a fixed duty cycle over a period in which an accelerometer will wake up and operate for part of the period, and then enter a low power mode for the rest of the period.

However, traditional duty cycle operation has several major drawbacks. First of all, because the monitoring only occurs periodically, traditional duty cycle operation results in low accuracy. Fixed duty cycle implementations work by tracking a timestamp, and thus do not track activity well, especially between transitions in activity state. Secondly, traditional duty cycle implementations have long latency. If the accelerometer happens to enter a low power state just prior to a state transition, the system can fail to track activity for a significant period of time relative to the activity. Lastly, traditional duty cycle implementations have a complicated interface. The duty cycle parameters tend to be difficult for application developers to configure properly.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, an activity monitoring circuit enables power conservation for an activity monitoring system by implementing adaptive duty cycle management. Activity monitoring systems detect, based on sensor input, what state of activity the current device is in. Such an activity will be understood to be generated by a user of the device as the device is carried by the user. The activity monitoring can be via a sensor device such as an accelerometer that generates activity data based on detected movement. An activity monitoring circuit receives the activity data as input from the sensor device, and processes the activity data. Based on the processing, the activity monitoring circuit signals the sensor device to change a duty cycle of its operation, by adjusting how long it is on and off, or how long it is active and idle within a period.

The activity monitoring circuit can include a sensor hub that determines an activity state indicated by the activity data. In one embodiment, the activity monitoring circuit generates a prediction of stability of the determined activity state based on historical activity data input. Based on activity state and stability, the sensor hub can determine a duty cycle for operation of the sensor device. In one embodiment, the historical activity data can be weighted more heavily for newer data versus older data. In one embodiment, the sensor hub determines duty cycle based on activity state and stability prediction, as well as on one or more other sensor inputs that can indication a state transition or other data. The sensor hub can signal the duty cycle setting to the sensor to cause the sensor to suspend or resume operation, and to operate based on a calculated duty cycle.

The duty cycle for the sensor can be operated in realtime based on a calculation of what is happening with the sensor. Thus, adaptive duty cycle operation in accordance with what is described herein can enable significant power savings for the system balanced with a desire for accuracy. Adaptive duty cycle operation can enable a system to balance power and accuracy. Adaptive duty cycle operation can ensure that the sensor is active during state transitions, and can allow the sensor to be largely idle when the activity state is stable.

With adaptive duty cycle operation, a sensor generates activity data, which a sensor hub or other sensor controller processes. The controller can extract activity information from the input data, by determining an activity state based on the input. Determining activity state is known and can be performed in accordance with known techniques. Generally, such techniques include detecting patterns of input data and matching them to expected patterns.

In one embodiment, the controller determines how stable the activity state is. The stability can be calculated based on historical data and activity interrupts that can indicate a state change. A highly stable activity state refers to an activity that is not changing, and has a low probably of changing within the next period or several periods of operation of the sensor. Lower stability activity states refer to activity states that are changing or cannot be determined based on the input from the sensor. The controller can dynamically determine when to slow the operation of the sensor, and when to resume operation of the sensor based on stability. It will be understood that the operation of the sensor can refer specifically to its operation with respect to activity monitoring. In one embodiment, the sensor can operate and provide information for other purposes even if the activity monitoring is suspended.

In a common implementation, the sensor is a motion sensor, such as an accelerometer. The processor includes logic to implement activity monitoring. In one embodiment, the activity monitoring is performed as a monitoring algorithm on a sensor controller. In one embodiment, the controller employs machine learning to determine a confidence level of the activity state. The confidence can be based on feedback from historical data to feed the machine learning. In one embodiment, the historical data can be weighted based on when it was received to filter out older data and rely more heavily on newer data, while allowing the older data to inform the determinations of state and confidence.

In one embodiment, the historical data is stored in a buffer accessible by the controller. The controller can access the data and perform one or more calculations to filter noise and calculate the stability of the activity. In one embodiment, based at least in part on the historical information and stability information the controller can determine how to control the duty cycle of the sensor.

Figure 1:
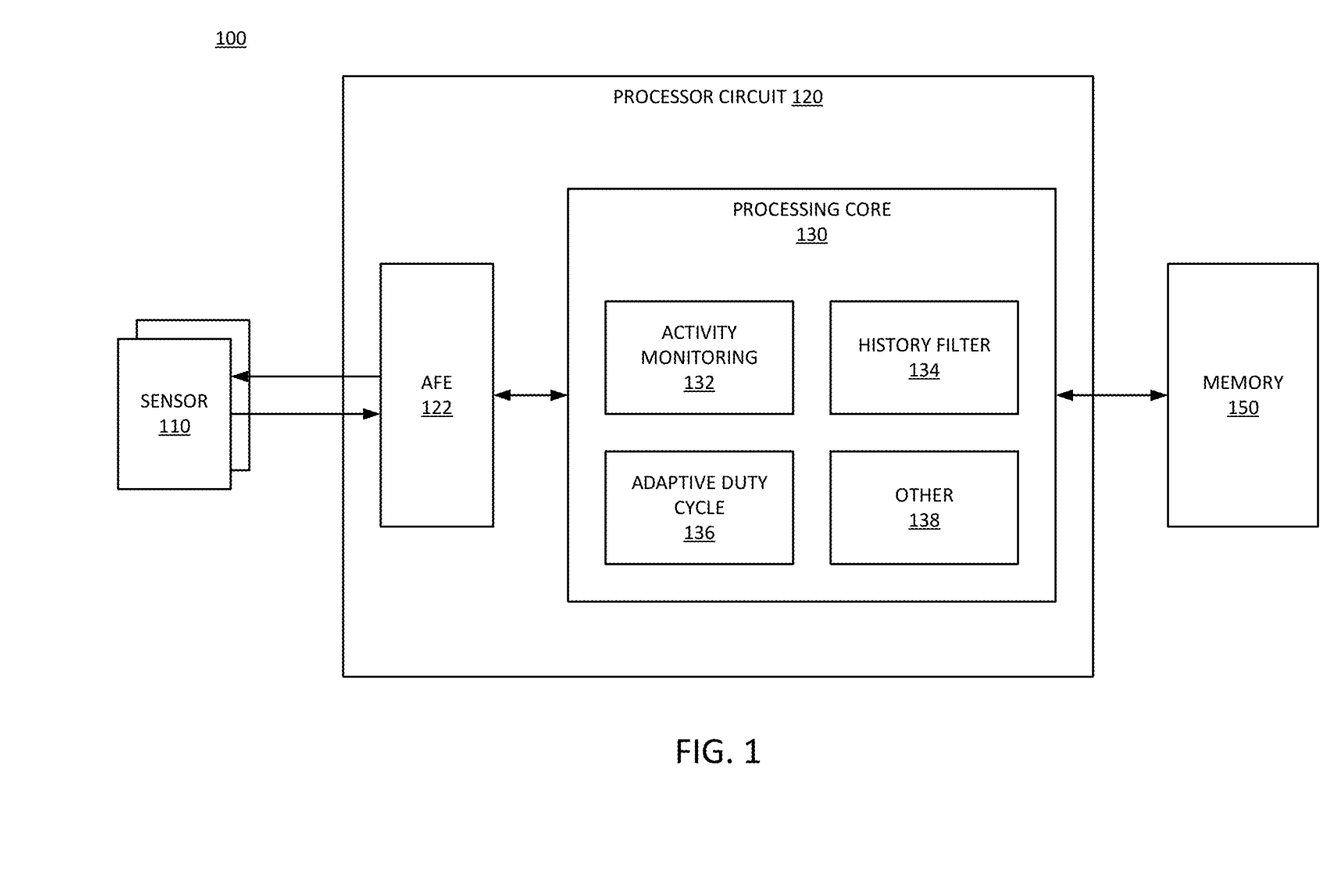
FIG. 1 is a block diagram of an embodiment of a system with adaptive duty cycle management for an activity monitoring sensor.

FIG. 1 is a block diagram of an embodiment of a system with adaptive duty cycle management for an activity monitoring sensor. System 100 includes elements of a computing device. Sensor 110 represents one or more sensors in system 100 to generate activity data. The activity data can be any raw data generated by a sensor. The raw data refers to a value of the sensor at a point when it is sampled. System 100 represents circuitry to receive the activity data from sensor 110. Processor circuit 120 processes the raw data to determine what is indicated by the sensor.

Processor circuit 120 can be or include an ASIC (application specific integrated circuit), mixed signal circuitry to process digital and analog signals, one or more processors, and/or other circuitry. In one embodiment, processor circuit 120 includes multiple discrete components or circuits. In one embodiment, processor circuit 120 is a system on a chip (SoC) device. In one embodiment, memory 150 can be included within processor circuit 120. In one embodiment, processor circuit 120 represents an integrated sensor hub (ISH) that integrates processing for multiple different sensors. In one embodiment, processor circuit 120 is incorporated into a device or SoC of a host processor in a computing device where the host processor executes a host operating system that controls the computing device. In one embodiment, processor circuit 120 is separate from the host processor. The ISH can be or include a microcontroller, coprocessor, digital signal processor, and/or other processing hardware.

In one embodiment, sensors 110 generate digital output that can be received and processed directly by processor circuit 120. In such a case, processor circuit 120 can include an interface circuit that interfaces with digital signals. In one embodiment, one or more sensors 110 generate an analog output. In one embodiment, processor circuit 120 includes AFE (analog frontend) 122, which can convert the analog signals into digital signals for processing by processing core 130. In one embodiment, AFE 122 receives both analog and digital signals. AFE 122 can include receivers, drivers, input termination, multiplexers, and/or other logic or circuits to interface with sensor 110.

Processor circuit 120 includes processing core 130, which represents logic resources to execute operations and process activity data received from sensor 110. Processing core 130 can be or include a CPU (central processing unit), signal processor, programmable logic unit (PLA), and/or other logic. In one embodiment, processing core 130 includes multiple execution blocks to perform the processing of the activity data. By way of example of the types of execution blocks that processing core 130 can include, and not by way of limitation, in one embodiment system 100 includes activity monitoring 132, history filter 134, and adaptive duty cycle 136. Processing core 130 can also include other logic 138.

Activity monitoring 132 represents execution logic to receive and process activity data from sensor 110, and more specifically, to determine what activity state is represented by the sensor data. In one embodiment, sensor 110 includes at least one accelerometer and/or other sensor to generate movement data or motion sensing data. In one embodiment, based on data received from sensor 110, activity monitoring 132 can identify one of multiple discrete activity states defined for system 100. Specific activity states will correspond with patterns of input data.

History filter 134 represents execution logic to selectively use historical data to provide more information about the activity data. In one embodiment, system 100 stores at least a number N of sensor samples in memory 150. In one embodiment, history filter 134 calculates a stability of the determined activity state by applying weights to the activity data (e.g., by multiplying a weighted factor with the activity data value and summing the results of multiple samples). In one embodiment, older data is weighted less heavily than newer data, and data beyond the number N of samples is deleted and/or overwritten. History filter 134 can thus filter noisy samples and generate a prediction of stability of the activity.

Adaptive duty cycle 136 represents execution logic to determine from the activity state and the historical data what duty cycle should be applied to the operation of one or more sensors 110. In one embodiment processor circuit 120 can generate a signal as represented by the arrow going from AFE 122 to sensor 110 to signal the sensor to suspend operation. In one embodiment, sensor 110 defaults to an always-on condition, and shuts down for a period as represented by a cycle in response to a signal from processor circuit 120. Rather than having a fixed duty cycle for sensor 110, or allowing sensor 110 to operate always-on, system 100 can dynamically determine a duty cycle for the sensor based on a current activity and a predicted stability of the activity. Thus, the sensor can be active to respond to changing conditions, but idle during periods when the activity does not change. Such dynamically changing the operating cycle of the sensor is based on input received from the sensor itself, and enables significant power savings, as shown in more detail below.

In one embodiment, adaptive duty cycle 136 receives one or more interrupt inputs that can indicate a change of states, from one activity state to another. Such interrupts can further inform the adaptive duty cycle analysis, and for example, adaptive duty cycle logic can respond by allowing a sensor to remain active or requesting a sensor and/or activity monitoring sampling and/or processing to be active in response to the interrupts. Thus, processor circuit 120 can respond to a change of states with activity in addition to adjusting an operational duty cycle down to save power. System 100 is thus capable of providing better balance of power consumption versus accuracy.

It will be understood that processor circuit 120 can adjust the rate of sampling sensor 110 as well as adjusting the operating duty cycle of sensor 110. Thus, processor circuit 120 can adjust a sampling rate in accordance with known techniques and conserve power by selectively sampling and spacing the sampling. Adaptive duty cycle logic extends control beyond simply adjusting the sampling rate. Rather, the operation of sensor 110 itself can be adjusted based on determining what state the system is in. Thus, system 100 can be contrasted, for example, from a system of cascading sensors, where a low power sensor is used to wake up a sensor with higher power consumption. In system 100 the power consumption savings occurs by selectively adjusting the duty cycle of operation of sensor 110 based on input from sensor 110.

Figure 2:
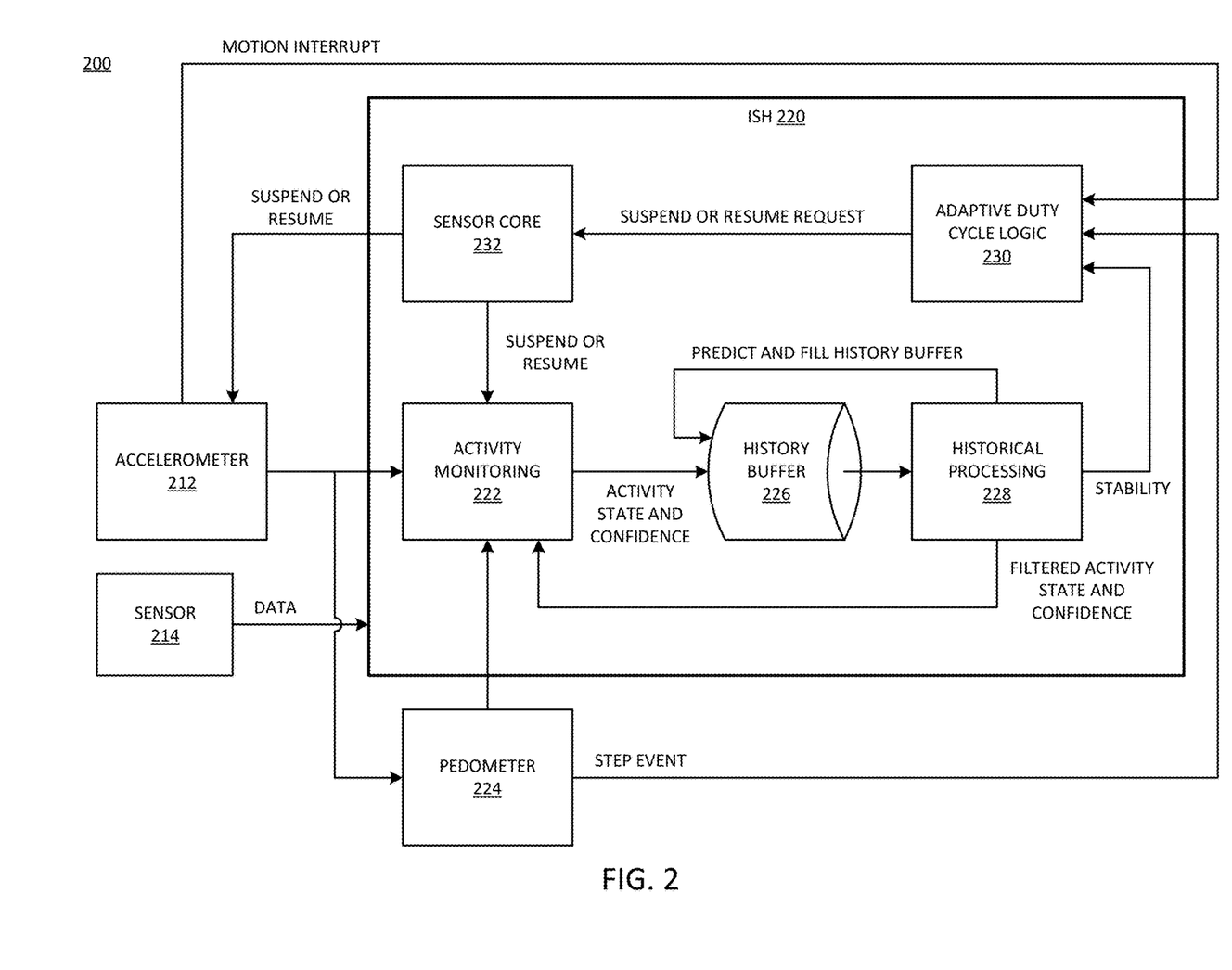
FIG. 2 is a block diagram of an embodiment of a system that performs adaptive duty cycle management based at least on activity state and stability prediction.

FIG. 2 is a block diagram of an embodiment of a system that performs adaptive duty cycle management based at least on activity state and stability prediction. System 200 represents elements of a sensor system, and can be one example embodiment of system 100 of FIG. 1. It will be understood that system 200 does not necessarily reflect specific hardware components. While there is hardware logic that performs the operations described in system 200, a single processor can perform multiple different functions, for example.

System 200 includes accelerometer 212, which is a sensor that captures motion information for system 200. In one embodiment, system 200 includes one or more additional sensors 214, which are coupled to the same sensor processor, and provide sensor input other than accelerometer data. One or more sensors can provide location data, user biological/physical condition data, gyroscopic data, or other data.

In one embodiment, system 200 includes ISH 220, which includes one or more circuits to process sensor data. When the processing logic is integrated, it can perform processing on data from more than one sensor, and coordinate the data from multiple sensors. In one embodiment, ISH 220 performs adaptive duty cycle management for accelerometer 212 based on data from accelerometer 212. In one embodiment, ISH 220 further processes data from sensor 214 to perform adaptive duty cycle management for accelerometer 212; thus, based on data from accelerometer 212 and from sensor 214.

Activity monitoring 222 represents logic in ISH 220 to generate an activity state determination based on sensor input data. In one embodiment, activity monitoring 222 is executed as a series of operations or a subroutine in ISH 220. In one embodiment, activity monitoring 222 performs machine learning techniques to make an activity determination based on input data compared to historical data. In one embodiment, in addition to generating an activity state, activity monitoring 222 generates a confidence value for the state, which can be represented as $$\text{confidence}(s, t-i).$$

History buffer 226 represents a memory or storage to which ISH 220 is coupled, which stores historical data. In one embodiment, history buffer 226 is a memory that is part of ISH 220. In one embodiment, history buffer is a RAM (random access memory) device. Historical processing 228 is coupled to history buffer 226, and filters the historical data. In one embodiment, historical processing 228 predicts and fills the history buffer. In one embodiment, historical processing 228 generates weighted historical values, and can store those values back into history buffer 226 for a subsequent activity monitoring operation. In one embodiment, historical processing 228 generates a filtered activity state and confidence computation, which it can provide as input to activity monitoring 222. Activity monitoring 222 can use the filtered information in generating future determinations about what activity state the system is in, and what confidence is associated with the state. In one embodiment, historical processing 228 applies a weighted average filter on history buffer 226 to filter out noise or disturbance. In one embodiment, historical processing 228 performs the filtering in accordance with the following formula:

$$\text{confidence}_{filtered}(s, t) = \sum_{i=0}^{N-1} w(s, t-i) * \text{confidence}(s, t-i)$$

In accordance with the formula, the filtered confidence value for a current activity state s at time t is the confidence value at the previous time t−i times a corresponding weight value for the previous time. The weights can be different for each activity state. In one embodiment, the weights can change with time.

In one embodiment, historical processing 228 tracks the stability of the current activity state. A high stability indicates that the activity state has not changed recently, and the prediction is made that it is not likely to change in the near future. The period of changing in the past or the future will be understood to mean a matter of historical samples, which can vary depending on how often a period is for a sensor, on the order of seconds or portions of seconds. In one embodiment, historical processing 228 provides the stability measurement to adaptive duty cycle logic 230.

Adaptive duty cycle logic 230 determines a suspend time for accelerometer 212 based on the input data. In one embodiment, historical processing 228 can be considered part of adaptive duty cycle logic 230, and a determination of the duty cycle for accelerometer 212 is made based on operations of both historical processing and calculations based on the stability. In one embodiment, adaptive duty cycle logic 230 adjusts the duty cycle of accelerometer 212 by providing a suspend time for the sensor.

It will be understood that historical data can cause a delay in responding to new state changes if accelerometer 212 is suspended only based on historical data. In one embodiment, adaptive duty cycle logic 230 receives information about one or more external inputs that can signal when a condition exists that indicates a state change is occurring. Consider an embodiment when system 200 includes pedometer 224. In one embodiment, pedometer 224 is a standalone sensor. In one embodiment, pedometer 224 operates based on activity data from accelerometer 212. In one embodiment, pedometer 224 is implemented as an algorithm or execution block within ISH 220. In one embodiment, pedometer 224 generates a "step event" indication, which signals that changes in motion match a pattern of a user taking a step.

In one embodiment, adaptive duty cycle logic 230 detects a step event and adjusts its determination of the duty cycle for accelerometer 212. For example, a step event can cause adaptive duty cycle logic 230 to drop a duty cycle determination and trigger accelerometer 212 to become more active to respond to a potential state change indicated by the step event. In one embodiment, adaptive duty cycle logic 230 receives a motion interrupt from accelerometer 212. Adaptive duty cycle logic 230 can respond in similar fashion to a motion interrupt as to a step interrupt. A motion interrupt can signal that an activity state change is likely, and adaptive duty cycle logic 230 can adjust its determination of duty cycle for accelerometer 212 to allow it to be active enough to determine if there is a corresponding activity state change. In one embodiment, accelerometer 212 can operate in a low power, idle, or suspend state in accordance with a signal from ISH 220, and wake up periodically to check for changes in motion. A change in motion can trigger an interrupt, which accelerometer 212 can respond to be waking up and measuring.

In one embodiment, based at least on historical data and stability predictions, adaptive duty cycle logic 230 can dynamically determine when to suspend or resume activity monitoring within system 200. In one embodiment, adaptive duty cycle logic 230 further makes the determination based on motion and/or step interrupts and/or other interrupts. In one embodiment, accelerometer 212 generates an interrupt that affects adaptive duty cycle management. In one embodiment, sensor 214 generates an interrupt that affects the adaptive duty cycle management. In one embodiment, Adaptive duty cycle logic 230 can generate a request to suspend or resume activity monitoring based on activity state for system 200, stability information, and possibly interrupt information.

In one embodiment, adaptive duty cycle logic 230 includes suspending logic that accounts for the stability of an activity, where higher stability has a longer suspending time. In one embodiment, system 200 includes a maximum allowed latency which adaptive duty cycle logic 230 factors when determining to suspend or resume activity monitoring. As mentioned previously, accounting for motion interrupts can enable system 200 to resume activity monitoring quickly, which reduces latency and improves accuracy.

Sensor core 232 represents logic within ISH 220 to implement operations within system 200 to generate the appropriate signals needed to trigger the suspending or resuming of activity monitoring. In one embodiment, sensor core 232 is the primary control logic or primary controller of ISH 220. In one embodiment, sensor core 232 is logic to control communication between components of system 200. In one embodiment, sensor core 232 sets configuration and distributes data to and from the sensors. Sensor core 232 can provide control signals to one or more sensors and/or to the execution logic of ISH 220. In one embodiment, sensor core 232 sets configuration of ISH 220 for timing and operating conditions to interface with the sensors of system 200. The configurations control when and how ISH 220 receives and processes data from the sensors.

In one embodiment, in response to a request for to suspend or resume activity monitoring from adaptive duty cycle logic 230, sensor core 232 can suspend or resume activity monitoring 222. Suspending and resuming activity monitoring 222 can refer to suspending and resuming the sampling and processing of data from accelerometer 212. In one embodiment, sensor core 232 can suspend or resume accelerometer 212, which can refer to changing a duty cycle of how long accelerometer 212 is active during a given period. Suspending and resuming can refer to sending control signals to the logic or sensors to perform the operations requested.

In one embodiment, sensor core 232 performs operations to take action corresponding to the request by adaptive duty cycle logic 230 as well as system state or the determined activity state. For example, if the current determined activity is sedentary, and the activity is determined to be stable, activity monitoring 222 can be suspended indefinitely. In one embodiment, sensor core 232 can separately control the operation of activity monitoring 222 and accelerometer 212. In addition to suspending activity monitoring 222, sensor core 232 can suspend accelerometer 212 and configure it to work in interrupt mode.

Consider the following examples for system 200. In one embodiment, activity monitoring 222 is suspended, and is resumed when one of the following conditions is met: 1) a suspending time period expires; 2) a motion interrupt occurs from accelerometer 212; or, 3) there is a step event from pedometer 224. In one implementation, when sensor core 232 triggers a suspension, it also triggers or registers a countdown timer. When the counter timer expires, a timeout event can trigger to resume activity monitoring. In one embodiment, a motion interrupt from the accelerometer includes a transition from sedentary to motion. In one embodiment, pedometer 224 can determine if there are continuous or non-continuous step counts, which indicate a transition between walking/running and other activity states like biking or in-car. In one implementation, if the last activity state before suspending is not walking or running, sensor core 232 will resume activity monitoring 222 if there are a continuous number of steps (e.g., 10 steps). In one implementation, if the last activity state before suspending is walking or running, sensor core 232 will resume activity monitoring 222 if there is no step, or the step type has changed during the suspending time.

Figure 3:
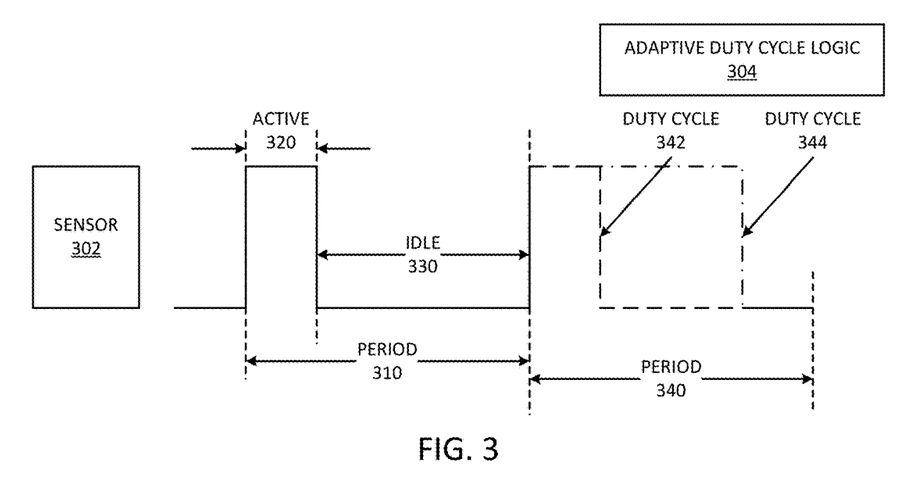
FIG. 3 is a representation of an embodiment of adaptive duty cycle management for a sensor.

FIG. 3 is a representation of an embodiment of adaptive duty cycle management for a sensor. In one embodiment, adaptive duty cycle logic 304 performs adaptive duty cycle management in accordance with any embodiment described herein. With adaptive duty cycle management, adaptive duty cycle logic 304 can adjust the duty cycle of sensor 302. The duty cycle of operation of sensor 302 is represented in periods 310 and 340. In period 310, sensor 302 is active for sub-period 320 and idle for sub-period 330. While the spacing is not necessarily representative of an actual system implementation, the approximate duty cycle of period 310 is 25%, seeing that active sub-period 320 is approximately one-fourth of the total period 310.

Consider that the duty cycle of period 310 represents a lower duty cycle due to adaptive duty cycle logic 304 lowering the duty cycle because of detection of a stable activity state. In one embodiment, period 340 has the same duty cycle, as shown by duty cycle 342. Such a condition can occur if there is no change to the conditions that caused the setting of the duty cycle seen in period 310. In one embodiment, adaptive duty cycle logic 304 detects a condition that indicates a state change, and triggers a change of duty cycle for period 340. Duty cycle 344 represents a different duty cycle based on a detected condition, such as a state change. It will be understood that the representations of duty cycle are for purposes of illustration and do not necessarily indicate an actual implementation. For example, when detecting a change of state, adaptive duty cycle 304 may trigger sensor 302 to have a duty cycle of 100% in period 340.

Figure 4:
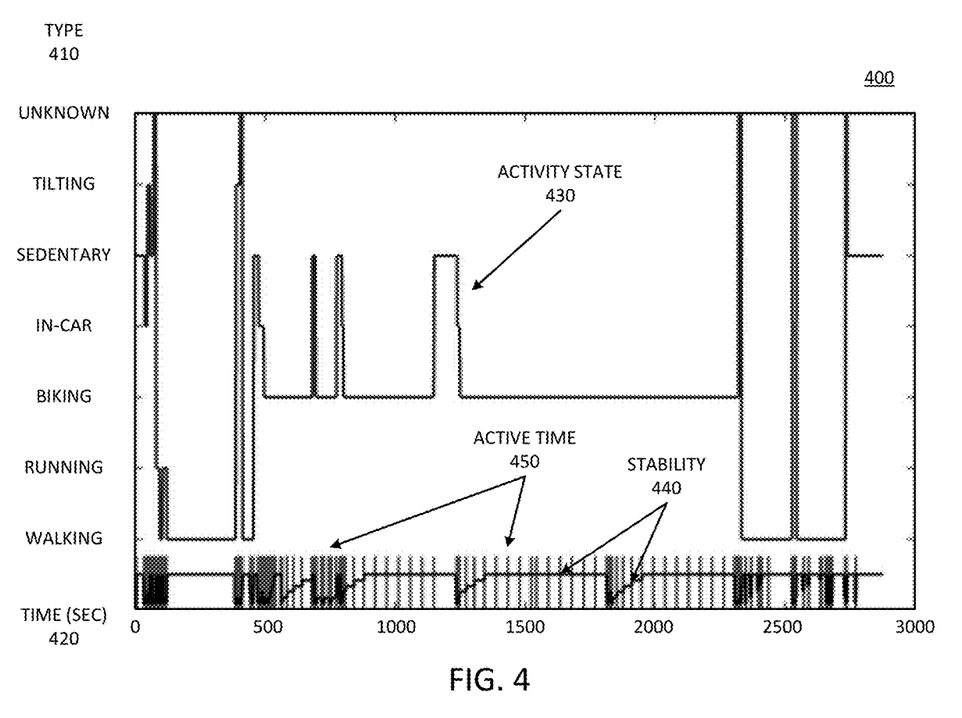
FIG. 4 is a diagrammatic representation of an embodiment of adaptive duty cycle management in an activity monitoring system.

FIG. 4 is a diagrammatic representation of an embodiment of adaptive duty cycle management in an activity monitoring system. Diagram 400 illustrates one example of results in a system with an accelerometer controlled by adaptive duty cycle logic in accordance with an embodiment described herein. Diagram 400 illustrates activity type 410 against time 420. Time is reflected in seconds, and activity type 410 is one of multiple discrete states identified or calculated based on sensor input. The conditions of diagram 400 reflect a test vector in which a user takes an electronic device on the way to the office.

In one embodiment, type 410 can be one of Unknown, Tilting, Sedentary, In-car, Biking, Running, or Walking. In other implementations, other states can be used, and/or can replace states illustrated in diagram 400. Activity type 410 represents any one of multiple distinct states of activity as determined by defined movement parameters. When movement parameters match particular patterns, the activity monitoring logic determines that a specific activity state is indicated. In addition to the largest curve showing activity state 430, diagram 400 illustrates stability 440 represented by the small solid line below the possible activity states. In one embodiment, the series of pulses at the base of diagram 400 represents active time 450. The active time is the amount of time the sensor is active based on adaptive duty cycle management.

It will be seen that the active time changes dynamically. The activity monitoring is mostly suspended throughout diagram 400, and is then resumed when there is an activity transition or when the activity is not stable. Active time 450 increases corresponding to a change of activity state 430. There is a corresponding change of stability 440 as the active time 450 changes. For example, around the 500 second mark, activity state 430 changes multiple times, and active time 450 increases correspondingly. Stability 440 goes down as active time 450 increases, and stability 440 increases during the periods of time when activity state 430 is not changing. It will be understood that the timing illustrated is representative only, and the ultimate timing is based on the sensor type. It will also be understood that there is a change of active time 450 and corresponding change in stability 440 just before the 2000 second mark, which is likely attributed to instability in the sensor input.

Figure 5:
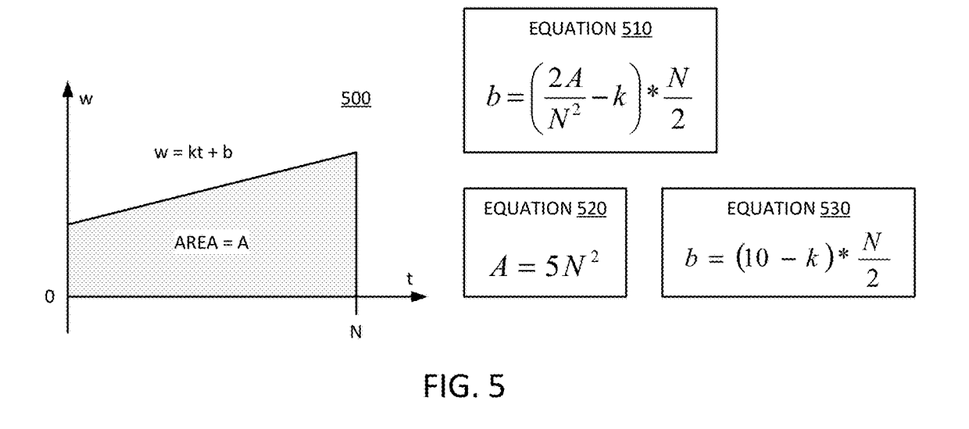
FIG. 5 is a diagrammatic representation of an embodiment of history filtering calculation with corresponding equations.

FIG. 5 is a diagrammatic representation of an embodiment of history filtering calculation with corresponding equations. Diagram 500 represents one embodiment of operation of historical processing logic in accordance with an embodiment described herein. In one embodiment, historical processing logic applies a weighted average filter on a history buffer to filter out the disturbances. As mentioned above, in one embodiment, historical processing can filter in accordance with the following formula:

$$\text{confidence}_{filtered}(s, t) = \sum_{i=0}^{N-1} w(s, t-i) * \text{confidence}(s, t-i)$$

In accordance with the formula, more weight can be placed on more recent historical results, with a slope or intercept that can be tuned to balance the accuracy and latency. The number N is selected to provide enough history to provide accuracy within a tolerated latency. The number can be different for each implementation. In one experiment, N was selected as 6, with weights chosen as a linear function of time. Non-linear weights could also be used. In one embodiment, N can be different for different activities. In general, a larger value for N increases latency because it stores more history, but a smaller value of N decreases accuracy.

Graph 500 illustrates the slope at which the value of weight w falls off over time t. Consider that N is the number of historical results used at time t, with the weight calculated to be w=kt+b, where k is a constant selected based on the specific implementation. In one embodiment, the number of historical results to process is consistent, and the shaded area can be assumed to be a constant A. With such an assumption, b can be calculated from k and A in accordance with equation 510:

$$b = \left(\frac{2A}{N^2} - k\right) * \frac{N}{2}$$

In one embodiment, A is assumed to be a constant having the definition as set forth in equation 520:

$$A = 5N^2$$

Where the assumption of equation 520 is used, equation 510 can be calculated in accordance with equation 530:

$$b = (10 - k) * \frac{N}{2}$$

Figure 6A:
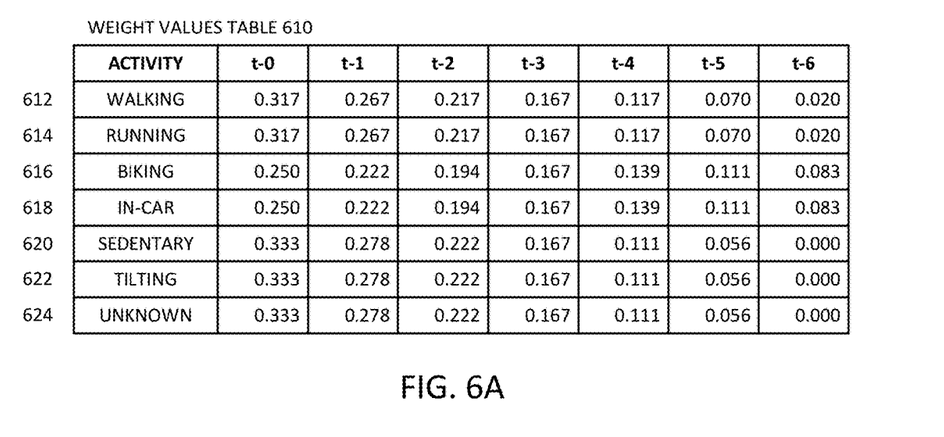
FIG. 6A is an embodiment of a table showing experimental weights.

While different values can be used in each different implementation, one example of weight values used is set out in table 610 of FIG. 6A.

In one embodiment, in addition to applying a weighted average to the data stored in the history buffer, historical processing can measure and track the stability of current activity state. Such operation can be said to generate a stability prediction. In one embodiment, the stability is measured as the lasting time of the current activity state over the total buffered history time, in accordance with the following:

$$\text{stability} = \frac{\text{lasting time of current activity state}}{\text{total buffered history time}} * 100\%$$

In one embodiment, historical processing also predicts and fills the history buffer to measure the stability continually after resuming. The prediction can be based on the assumption that an activity state with high stability will stay unchanged in the future.

In one embodiment, the sensor core calculates the suspending or idle time based on the calculated stability. For example, in one embodiment, the sensor core computes idle time as follows:

$$\text{idle time} = \begin{cases} \text{stability} * \text{MaxAllowedLatency}, & \text{for stability} > S \\ 0, & \text{otherwise} \end{cases}$$

In the idle time computation, S is the minimum stability threshold. The minimum stability threshold can be determined by experiment as set for each implementation. In one example implementation, a minimum threshold for biking and in-car was set as 40%, and for walking or running was set as 10%. In one embodiment, the MaxAllowedLatency can be set based on an expected latency that would still be expected to provide sufficient accuracy. As with the minimum threshold, the maximum latency can be set based on experiment, and can be different for each implementation. In one example, MaxAllowedLatency was set as 5 seconds for a current stable activity of walking or running, and 40 seconds for biking or in-car. Other settings are possible.

FIG. 6A is an embodiment of a table showing experimental weights. Table 610 illustrates various weight values that were used in the experiment that generated the results in FIG. 4. The weights illustrated were normalized by area A, referring to graph 500 of FIG. 5. For each activity, and for each time up to the total number N of values stored in the history buffer, example weights are illustrated. In accordance with table 610, it can be seen how different activities fall off at different rates. The different gradients at which the activity value falls off can be attributed to different allowed latencies for different activities.

In one embodiment, the weights fall off at the same rate for walking 612 and running 614. In one embodiment, different weights and rates apply to biking 616 and in-car 620. In one embodiment, different weights and rates apply to sedentary 620, tilting 622, and unknown 624, wherein unknown can refer to when the activity state cannot be determined from the sensor input.

Figure 6B:
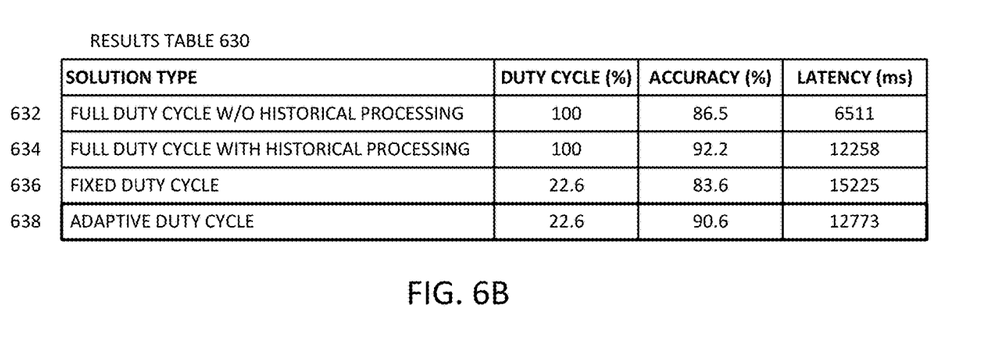
FIG. 6B is an embodiment of a table showing experimental results.

FIG. 6B is an embodiment of a table showing experimental results. Results table 630 represents results of experimentation in accordance with FIGS. 4 through 6A as compared to traditional implementations. Row 632 illustrates results of performing full duty cycle without historical processing. In such an implementation, the duty cycle of the sensor is 100%, accuracy is 86.5%, and the latency was 6511 ms (milliseconds). Row 634 illustrates results of performing full duty cycle with historical processing. In such an implementation, the duty cycle of the sensor is 100%, accuracy is 92.2%, and the latency was 12258 ms. It will be observed how the addition of historical processing by storing and using historical data can improve accuracy, but degrades the latency.

Row 636 illustrates results of performing a traditional fixed duty cycle implementation. In such an implementation, the duty cycle of the sensor is averaged to be 22.6%, which can save significant amounts of power. However, saving power in such an implementation comes at a significant cost to accuracy, as accuracy is only 83.6%, and it significantly increases the latency, with a latency of 15225 ms. Row 638 illustrates results of performing an adaptive duty cycle implementation in accordance with an embodiment described herein. In such an implementation, the duty cycle of the sensor was also averaged to be 22.6% like the fixed duty cycle implementation. However, it will be observed that despite saving significant power by reducing the duty cycle, the accuracy and latency values are comparable to that of a full duty cycle implementation with historical processing. More specifically, the system had an accuracy of 90.6%, and a latency of 12773 ms.

Thus, an embodiment of adaptive duty cycle management as described herein can provide significant advantages over known implementations. More particularly, adaptive duty cycle management provides balance between power and accuracy. Compared to the full duty cycle implementations of rows 632 and 634, although the adaptive duty cycle implementation is not quite as accurate as the full duty cycle with history (1.6 percent less accurate), it is more accurate than the full duty cycle without history (4.1 percent more accurate). Despite good accuracy, the adaptive duty cycle implementation reduces the active time of the sensor by 77.4%. The fixed duty cycle implementation having the same active time reduction has a 7% poorer accuracy than the adaptive duty cycle implementation.

Additionally, the latency of the adaptive duty cycle implementation is nearly the same as the full duty cycle with historical processing (12773 versus 12258, respectively), the latency is significantly better than the fixed duty cycle implementation (12773 versus 15225, a latency reduction of about 16%). It will be understood that because the system automatically adjusts the duty cycle based on the state of the system itself, there are automatic power savings, without the need for additional parameters. The idle and active times can be adjusted dynamically and automatically as the system functions.

Figure 7:
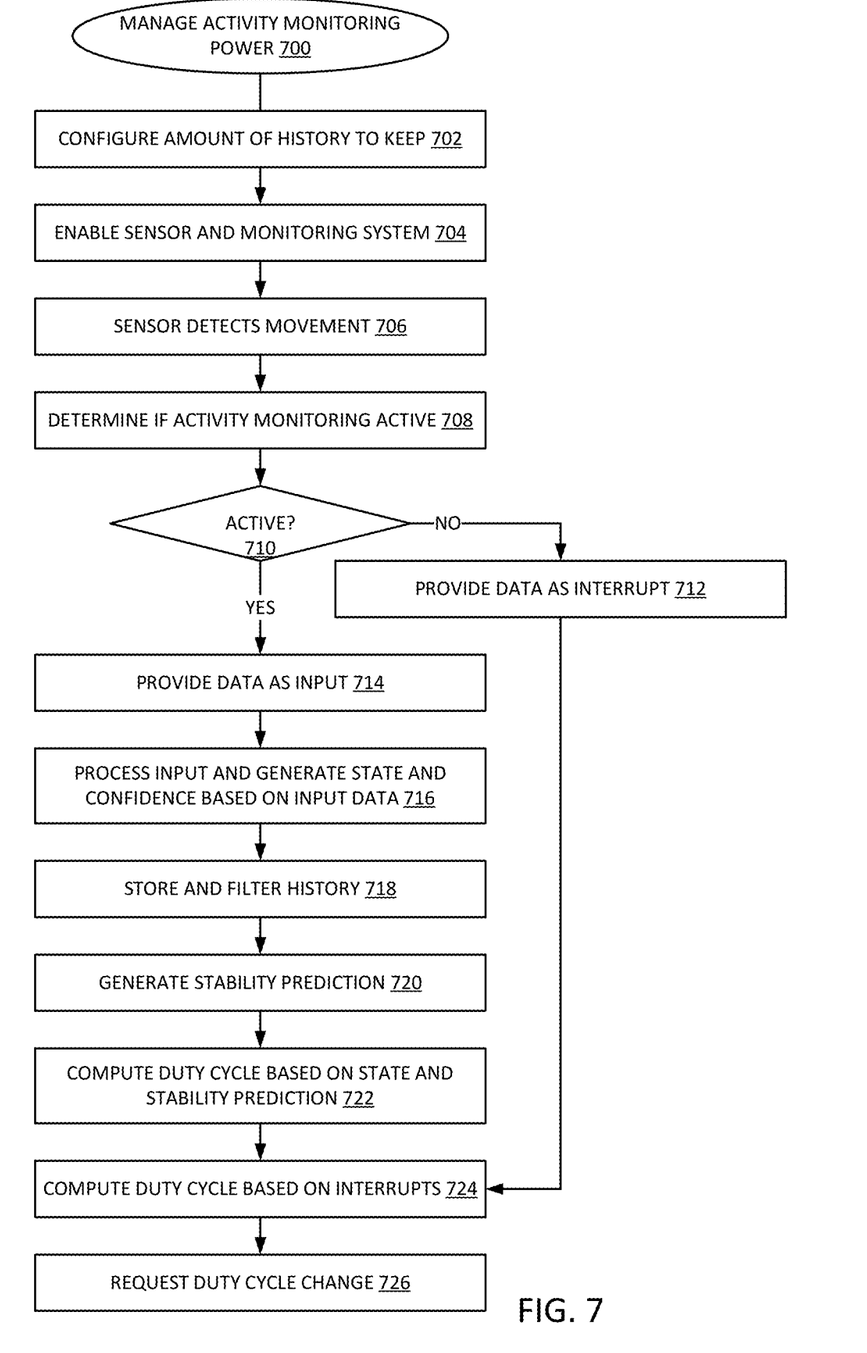
FIG. 7 is a flow diagram of an embodiment of a process for managing activity monitoring power with adaptive duty cycle management.

FIG. 7 is a flow diagram of an embodiment of a process for managing activity monitoring power with adaptive duty cycle management. System 700 describes operations for adaptive duty cycle management in accordance with any embodiment described herein. In one embodiment, a system designer configures an amount of history to keep for historical processing, 702. The amount of history can be selected in accordance with what is described above, and can be a value N.

A system with a sensor enables the sensor, such registering the sensor and configuring an interface to interoperate with the sensor, 704. The integrated sensor hub (ISH) or other processor can configure the sensor and its interface to receive data from the sensor. In one embodiment, when the sensor detects movement, 706, the system can determine if the activity monitoring is active, 708. If the monitoring is suspended or not active, 710 NO branch, in one embodiment, the sensor can provide the data generated as an interrupt, 712.

In one embodiment, if the activity monitoring is active, 710 YES branch, the sensor provides the generated activity data as a normal input to the activity monitoring logic, 714. In one embodiment, the activity monitoring logic processes the input data and generates state and confidence determinations based on the data, 716. In one embodiment, the system stores and filters historical data, 718. In one embodiment, historical processing logic generates a stability prediction based on the determined activity state and the stored historical data, 720.

In one embodiment, adaptive duty cycle logic computes a duty cycle operation based on the determine activity state and the computed stability prediction, 722. In one embodiment, in addition to activity state and stability, the adaptive duty cycle logic determines duty cycle of the sensor based on one or more interrupts, 724. For data provided as interrupt input from 712, the adaptive duty cycle logic can adjust for interrupts that indicate a change in activity state. In one embodiment, the adaptive duty cycle logic can determine to request a change in duty cycle, 726, and a sensor core can perform the operations necessary to implement the duty cycle changes.

Figure 8:
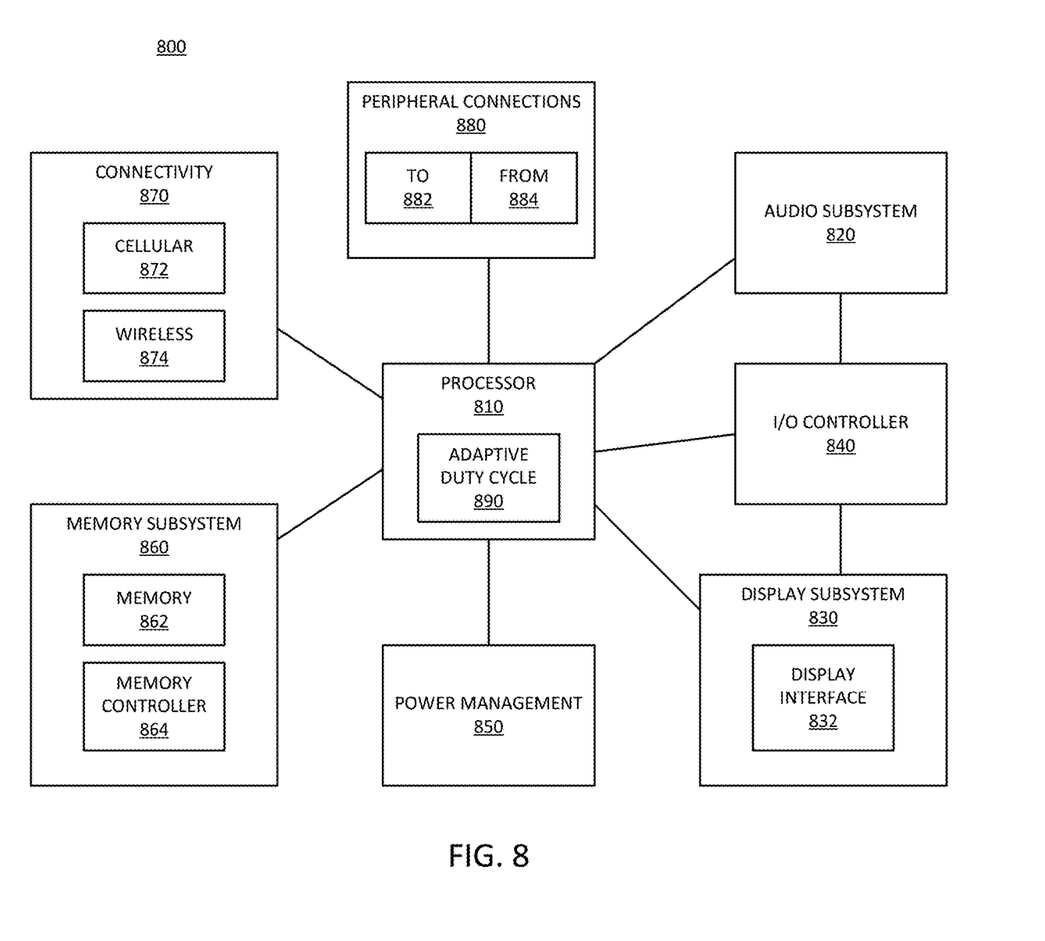
FIG. 8 is a block diagram of an embodiment of a device in which adaptive duty cycle management can be implemented.

FIG. 8 is a block diagram of an embodiment of a device in which adaptive duty cycle management can be implemented. Device 800 represents a mobile computing device, such as a laptop, computing tablet, a wireless-enabled e-reader, a mobile phone or smartphone, smart watch, fitness monitor or other wearable user monitor, wearable computing device, or other device. It will be understood that certain of the components are shown generally, and not all components of such a device are shown in device 800. Not all devices will necessarily include all components shown.

Device 800 includes processor 810, which performs the primary processing operations of device 800. Processor 810 can include one or more physical devices, such as microprocessors, application processors, microcontrollers, programmable logic devices, or other processing means. The processing operations performed by processor 810 include the execution of an operating platform or operating system on which applications and/or device functions are executed. The processing operations include operations related to I/O (input/output) with a human user or with other devices, operations related to power management, and/or operations related to connecting device 800 to another device. The processing operations can also include operations related to audio I/O and/or display I/O.

In one embodiment, device 800 includes audio subsystem 820, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 800, or connected to device 800. In one embodiment, a user interacts with device 800 by providing audio commands that are received and processed by processor 810.

Display subsystem 830 represents hardware (e.g., display devices) and software (e.g., drivers) components that provide a visual and/or tactile display for a user to interact with the computing device. Display subsystem 830 includes display interface 832, which includes the particular screen or hardware device used to provide a display to a user. In one embodiment, display interface 832 includes logic separate from processor 810 to perform at least some processing related to the display. In one embodiment, display subsystem 830 includes a touchscreen device that provides both output and input to a user. In one embodiment, display subsystem 830 includes a high definition (HD) display that provides an output to a user. High definition can refer to a display having a pixel density of approximately 100 PPI (pixels per inch) or greater, and can include formats such as full HD (e.g., 1080 p), retina displays, 4K (ultra high definition or UHD), or others.

I/O controller 840 represents hardware devices and software components related to interaction with a user. I/O controller 840 can operate to manage hardware that is part of audio subsystem 820 and/or display subsystem 830. Additionally, I/O controller 840 illustrates a connection point for additional devices that connect to device 800 through which a user might interact with the system. For example, devices that can be attached to device 800 might include microphone devices, speaker or stereo systems, video systems or other display device, keyboard or keypad devices, or other I/O devices for use with specific applications such as card readers or other devices.

As mentioned above, I/O controller 840 can interact with audio subsystem 820 and/or display subsystem 830. For example, input through a microphone or other audio device can provide input or commands for one or more applications or functions of device 800. Additionally, audio output can be provided instead of or in addition to display output. In another example, if display subsystem includes a touchscreen, the display device also acts as an input device, which can be at least partially managed by I/O controller 840. There can also be additional buttons or switches on device 800 to provide I/O functions managed by I/O controller 840.

In one embodiment, I/O controller 840 manages devices such as accelerometers, cameras, light sensors or other environmental sensors, gyroscopes, global positioning system (GPS), or other hardware that can be included in device 800. The input can be part of direct user interaction, as well as providing environmental input to the system to influence its operations (such as filtering for noise, adjusting displays for brightness detection, applying a flash for a camera, or other features). In one embodiment, device 800 includes power management 850 that manages battery power usage, charging of the battery, and features related to power saving operation.

Memory subsystem 860 includes memory device(s) 862 for storing information in device 800. Memory subsystem 860 can include nonvolatile (state does not change if power to the memory device is interrupted) and/or volatile (state is indeterminate if power to the memory device is interrupted) memory devices. Memory 862 can store application data, user data, music, photos, documents, or other data, as well as system data (whether long-term or temporary) related to the execution of the applications and functions of system 800. In one embodiment, memory subsystem 860 includes memory controller 864 (which could also be considered part of the control of system 800, and could potentially be considered part of processor 810). Memory controller 864 includes a scheduler to generate and issue commands to memory device 862.

Connectivity 870 includes hardware devices (e.g., wireless and/or wired connectors and communication hardware) and software components (e.g., drivers, protocol stacks) to enable device 800 to communicate with external devices. The external device could be separate devices, such as other computing devices, wireless access points or base stations, as well as peripherals such as headsets, printers, or other devices.

Connectivity 870 can include multiple different types of connectivity. To generalize, device 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 874 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 880 include hardware interfaces and connectors, as well as software components (e.g., drivers, protocol stacks) to make peripheral connections. It will be understood that device 800 could both be a peripheral device ("to" 882) to other computing devices, as well as have peripheral devices ("from" 884) connected to it. Device 800 commonly has a "docking" connector to connect to other computing devices for purposes such as managing (e.g., downloading and/or uploading, changing, synchronizing) content on device 800. Additionally, a docking connector can allow device 800 to connect to certain peripherals that allow device 800 to control content output, for example, to audiovisual or other systems.

In addition to a proprietary docking connector or other proprietary connection hardware, device 800 can make peripheral connections 880 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, system 800 includes adaptive duty cycle logic 890, which can include adaptive duty cycle logic in accordance with any embodiment described herein. In one embodiment, duty cycle logic 890 includes historical processing. In one embodiment, duty cycle logic 890 includes elements of a sensor core that implements operations to adjust the duty cycle of a motion sensor in accordance with computations made. The adaptive duty cycle management determines from activity state and stability information how to adjust the operation duty cycle of one or more sensors and/or activity monitoring. In one embodiment, the adaptive duty cycle management further accounts for motion interrupt information.

In one aspect, an electronic device includes: a sensor device to generate activity data based on movement of the electronic device; a sensor hub coupled to the sensor device, to process activity data from the sensor device; and logic coupled to the sensor hub to determine an activity state indicated by the activity data, and to generate a prediction of stability of the determined activity state based on historical activity data; wherein based on the determined activity state and the prediction of stability, the sensor hub to automatically change a duty cycle of execution of the sensor device.

In one embodiment, the sensor device comprises an accelerometer. In one embodiment, the sensor hub comprises logic separate from a host processor. In one embodiment, the logic to determine the activity state comprises to identify one of multiple distinct states having defined movement parameters. In one embodiment, the logic to generate the prediction of stability comprises to compute a confidence factor based on weighted historical data. In one embodiment, recent historical data is weighted more heavily than older historical data. In one embodiment, to change a duty cycle of execution of the sensor comprises reduce duty cycle of execution of the sensor device. In one embodiment, further comprising the logic to further receive a change of state indication, the sensor hub to send a signal via the I/O interface to change the duty cycle based on the determined activity state, the prediction of stability, and the change of state indication. In one embodiment, the change of state indication comprises a movement interrupt generated by the sensor. In one embodiment, the change of state indication comprises a state event change generated by the sensor. In one embodiment, the change of state indication comprises a state indication generated by a different sensor coupled to the sensor hub.

In one aspect, an activity monitoring circuit includes: an I/O (input/output) interface to couple to a sensor device, the sensor device to provide activity data based on detected movement by the sensor device; a sensor hub coupled to the I/O interface, to process activity data when provided from the sensor device; and logic coupled to the sensor hub configured to determine an activity state indicated by the activity data, and to generate a prediction of stability of the determined activity state based on historical activity data; wherein based on the determined activity state and the prediction of stability, the sensor hub to automatically send a signal via the I/O interface to change a duty cycle of execution of the sensor device.

In one embodiment, the sensor device comprises an accelerometer. In one embodiment, the sensor hub comprises logic separate from a host processor. In one embodiment, the logic to determine the activity state comprises to identify one of multiple distinct states having defined movement parameters. In one embodiment, the logic to generate the prediction of stability comprises to compute a confidence factor based on weighted historical data. In one embodiment, recent historical data is weighted more heavily than older historical data. In one embodiment, to change a duty cycle of execution of the sensor comprises reduce duty cycle of execution of the sensor device. In one embodiment, further comprising the logic to further receive a change of state indication, the sensor hub to send a signal via the I/O interface to change the duty cycle based on the determined activity state, the prediction of stability, and the change of state indication. In one embodiment, the change of state indication comprises a movement interrupt generated by the sensor. In one embodiment, the change of state indication comprises a state event change generated by the sensor. In one embodiment, the change of state indication comprises a state indication generated by a different sensor coupled to the sensor hub.

In one aspect, a method for activity monitoring includes: receiving activity data from a sensor device, the activity data based on detected movement by the sensor device; processing the activity data from the sensor device; determining an activity state indicated by the activity data; and generating a prediction of stability of the determined activity state based on historical activity data; and automatically sending a signal to change a duty cycle of execution of the sensor device based on the determined activity state and the prediction of stability.

In one embodiment, the sensor device comprises an accelerometer. In one embodiment, the sensor hub comprises logic separate from a host processor. In one embodiment, determining the activity state comprises identifying one of multiple distinct states having defined movement parameters. In one embodiment, generating the prediction of stability comprises computing a confidence factor based on weighted historical data. In one embodiment, recent historical data is weighted more heavily than older historical data. In one embodiment, sending the signal to change the duty cycle of execution of the sensor comprises sending the signal to reduce duty cycle of execution of the sensor device. In one embodiment, further comprising receiving a change of state indication, wherein sending the signal to change the duty cycle comprises sending the signal based on the determined activity state, the prediction of stability, and the change of state indication. In one embodiment, the change of state indication comprises a movement interrupt generated by the sensor. In one embodiment, the change of state indication comprises a state event change generated by the sensor. In one embodiment, the change of state indication comprises a state indication generated by a different sensor coupled to the sensor hub.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An electronic device, comprising:
an accelerometer to generate activity data based on movement of the electronic device;
a sensor hub coupled to the accelerometer, to process activity data from the accelerometer; and
logic coupled to the sensor hub to determine an activity state indicated by the activity data, and to generate a prediction of stability of the determined activity state based on historical activity data from the accelerometer, the prediction of stability to indicate that the determined activity state has stopped changing from a first activity state to a second activity state;
wherein based on the determined activity state from the activity data of the accelerometer and the prediction of stability based on the activity data from the accelerometer, the sensor hub to automatically change a duty cycle of execution of the accelerometer to set the duty cycle for the second activity state.

2. The electronic device of claim 1, wherein the sensor hub comprises logic separate from a host processor.

3. The electronic device of claim 1, wherein the logic to determine the activity state comprises the logic to identify one of multiple distinct states having defined movement parameters.

4. The electronic device of claim 1, wherein the logic to generate the prediction of stability comprises the logic to compute a confidence factor based on weighted historical data.

5. The electronic device of claim 4, wherein recent historical data is weighted more heavily than older historical data.

6. The electronic device of claim 1, wherein the sensor hub to change the duty cycle of execution of the accelerometer comprises the sensor hub to reduce the duty cycle of execution of the accelerometer.

7. The electronic device of claim 1, further comprising the logic to further receive a change of state indication, the sensor hub to send a signal to change the duty cycle based on the determined activity state, the prediction of stability, and the change of state indication.

8. The electronic device of claim 7, wherein the change of state indication comprises a movement interrupt generated by the accelerometer.

9. The electronic device of claim 7, wherein the change of state indication comprises a state event change generated by the accelerometer.

10. The electronic device of claim 7, wherein the change of state indication comprises a state indication generated by a different sensor coupled to the sensor hub.

11. An activity monitoring circuit, comprising:
an I/O (input/output) interface to couple to an accelerometer, the accelerometer to provide activity data based on detected movement by the accelerometer;
a sensor hub coupled to the I/O interface, to process activity data when provided from the accelerometer; and
logic coupled to the sensor hub to determine an activity state indicated by the activity data, and to generate a prediction of stability of the determined activity state based on historical activity data from the accelerometer, the prediction of stability to indicate that the determined activity state has stopped changing from a first activity state to a second activity state;
wherein based on the determined activity state and the prediction of stability, the sensor hub to automatically send a signal via the I/O interface to change a duty cycle of execution of the accelerometer to set the duty cycle for the second activity state.

12. The activity monitoring circuit of claim 11, wherein the logic to generate the prediction of stability comprises the logic to compute a confidence factor based on weighted historical data.

13. The activity monitoring circuit of claim 11, further comprising the logic to further receive a change of state indication, the sensor hub to send a signal via the I/O interface to change the duty cycle based on the determined activity state, the prediction of stability, and the change of state indication.

14. The activity monitoring circuit of claim 13, wherein the change of state indication comprises a movement interrupt generated by the accelerometer.

15. A method for activity monitoring, comprising:
receiving activity data from an accelerometer, the activity data based on detected movement by the accelerometer;
processing the activity data from the accelerometer;
determining an activity state indicated by the activity data; and
generating a prediction of stability of the determined activity state based on historical activity data from the accelerometer, the prediction of stability to indicate that the determined activity state has stopped changing from a first activity state to a second activity state; and
automatically sending a signal to change a duty cycle of execution of the accelerometer to set the duty cycle for the second activity state based on the determined activity state and the prediction of stability.

16. The method of claim 15, wherein generating the prediction of stability comprises computing a confidence factor based on weighted historical data.

17. The method of claim 15, further comprising receiving a change of state indication, wherein sending the signal to change the duty cycle comprises sending the signal based on the determined activity state, the prediction of stability, and the change of state indication.

18. The method of claim 17, wherein the change of state indication comprises a movement interrupt generated by the accelerometer.

* * * * *